United States Patent
Yang

(10) Patent No.: US 11,908,397 B2
(45) Date of Patent: Feb. 20, 2024

(54) LED BACKLIGHT MODULATION METHOD BASED ON DUTY CYCLE REFERENCE POINT SETTING

(71) Applicant: X-SIGNAL INTEGRATED CO., LTD., Beijing (CN)

(72) Inventor: Guanou Yang, Beijing (CN)

(73) Assignee: X-SIGNAL INTEGRATED CO., LTD., Beijing (CN)

( * ) Notice: Subject to any disclaimer, the term of this patent is extended or adjusted under 35 U.S.C. 154(b) by 0 days.

(21) Appl. No.: 18/228,005

(22) Filed: Jul. 31, 2023

(65) Prior Publication Data
US 2023/0377512 A1    Nov. 23, 2023

Related U.S. Application Data

(63) Continuation of application No. PCT/CN2022/136048, filed on Dec. 2, 2022.

(30) Foreign Application Priority Data

Mar. 7, 2022    (CN) .......................... 202210217571.5

(51) Int. Cl.
G09G 3/32        (2016.01)
G09G 3/34        (2006.01)

(52) U.S. Cl.
CPC .............. *G09G 3/32* (2013.01); *G09G 3/342* (2013.01); *G09G 2310/08* (2013.01); *G09G 2320/064* (2013.01); *G09G 2330/025* (2013.01)

(58) Field of Classification Search
None
See application file for complete search history.

(56) References Cited

U.S. PATENT DOCUMENTS

| | | | | |
|---|---|---|---|---|
| 2003/0085749 A1* | 5/2003 | Xu | ......................... | H05B 45/10 327/423 |
| 2005/0117367 A1* | 6/2005 | Chikugawa | ............ | H05B 45/22 362/555 |
| 2009/0225020 A1* | 9/2009 | Ran | ........................ | H05B 45/10 315/297 |
| 2013/0300770 A1* | 11/2013 | Yang | ...................... | H05B 45/46 315/192 |

FOREIGN PATENT DOCUMENTS

| | | |
|---|---|---|
| CN | 101231824 A | 7/2008 |
| CN | 101547540 A | 9/2009 |

(Continued)

*Primary Examiner* — Dorothy Harris
(74) *Attorney, Agent, or Firm* — Bayramoglu Law Offices LLC

(57) ABSTRACT

A light-emitting diode (LED) backlight modulation method based on duty cycle reference point setting is provided, and the LED backlight modulation method is applied to an LED backlight control circuit with row and column scan lines. Different duty cycle reference points are set for the LED string channels in the LED backlight control circuit in row-column scanning mode, whereby the LED string channels can be turned on or off at different time points during a turn-on duration of the row scan line to achieve lighting in the duty cycle, so as to realize the staggered setting of the turn-on time point and turn-off time point of each channel and avoid the need for large current jump at a power drive terminal.

6 Claims, 5 Drawing Sheets

(56) References Cited

FOREIGN PATENT DOCUMENTS

| | | |
|---|---|---|
| CN | 102629451 A | 8/2012 |
| CN | 111491412 A | 8/2020 |
| CN | 113077762 A | 7/2021 |
| CN | 114495848 A | 5/2022 |
| EP | 1950728 A2 * | 7/2008 .............. C02F 9/005 |

* cited by examiner

LED BACKLIGHT MODULATION METHOD BASED ON DUTY CYCLE REFERENCE POINT SETTING

CROSS REFERENCE TO THE RELATED APPLICATIONS

This application is the continuation application of International Application No. PCT/CN2022/136048, filed on Dec. 2, 2022, which is based upon and claims priority to Chinese Patent Application No. 202210217571.5, filed on Mar. 7, 2022, the entire contents of which are incorporated herein by reference.

TECHNICAL FIELD

The present invention relates to the technical field of light-emitting diode (LED) display, in particular to an LED backlight modulation method based on duty cycle reference point setting.

BACKGROUND

The LED backlight drive in the prior art generally uses a direct drive mode or a row-column scanning drive mode. As shown in FIG. 1, which illustrates LED backlight control in direct drive mode in the prior art, in this LED backlight drive circuit, the positive terminal (high potential terminal) of each LED string is connected to a driving voltage $V_{LED}$. The negative terminal (low potential terminal) of each LED string is connected to a line selection control switching device and a constant current module. The advantage of such a LED backlight drive circuit in direct drive mode lies in that each LED string is ensured to achieve 100% brightness display. Namely, when a LED string is required to have a maximum brightness output, it only needs to control the constant current module in such a manner that the maximum operating current of the LED string is outputted, and to set the line selection control switching device to 100% duty cycle. However, the direct drive mode has a very obvious drawback that it requires each LED string channel in the LED backlight drive circuit to be provided with an independent constant current source module to realize independent control of the LED string channel, which leads to extremely high hardware cost and control cost.

In addition, as shown in FIG. 2, in direct drive mode, in order to prevent multiple channels of the LED string channels from being turned on at the same time, which causes a large current impact to be formed at the drive voltage $V_{LED}$ terminal, different turn-on time points and the turn-off time points are usually set for the channels in the prior art, so as to prevent too many channels from being turned on or off at the same time, which results in a large current formed at the drive voltage $V_{LED}$ terminal. Furthermore, since all the channels have individual control switches, the turn-on time points and turn-off time points of the channels are not subject to the influence of the control signal clock cycle. Namely, the turn-on time point and turn-off time point of the control channel do not need to be limited to the same control signal clock cycle.

In the prior art, in order to reduce hardware cost and control cost, LED backlight control also has a row-column scanning mode based on high-end switching. In this mode, a plurality of LED string channels are provided, each LED string channel including a predetermined number of multiple LED strings. For all LED strings in each string channel, the LED strings are connected at the high potential terminals thereof to unique one of a plurality of row scan lines, each of which is provided with a switching device. In this row-column scanning mode, the LED backlight drive control cannot set the turn-on time points and turn-off time points of the LED string channels in different control signal clock cycles, and must ensure the turn-on time points and turn-off time points of the LED string channels to be set within the time period when the switching device of the row scan line is turned on. In this case, it is impossible to effectively achieve staggered setting of the turn-on time point and turn-off time point of each channel, which easily cause the LED strings of multiple channels to be turned on or off at the same time, resulting in occurrence of large current jump at a power drive terminal with a high potential. When the power drive terminal cannot meet the need for large current jump, it is easy to cause degradation of display quality.

SUMMARY

It is a technical object of the present invention to realize the staggered setting of the turn-on time point and turn-off time point of different channels in the row-column scanning LED backlight control circuit, so as to avoid large current jump at the power drive terminal.

In order to achieve the above technical object, the present invention provides an LED backlight modulation method based on duty cycle reference point setting, the backlight modulation method being applied to an LED backlight control circuit with row and column scan lines, the LED backlight control circuit with row and column scan lines including a plurality of LED string channels, each consisting of a predetermined number of multiple LED strings, and for all the LED strings in each LED string channel, the LED strings each being connected at high potential terminals thereof to unique one of a plurality of row scan lines, each of the row scan lines being provided with a switching device; wherein a duty cycle reference is set for each LED string channel, the duty cycle reference point being located in a selected duration of the row scan line, and the duty cycle reference point percentage X of the duty cycle reference point being expressed as:

$$X = \frac{T_X}{T_{SW}}; \text{ and } 0 < X < 1;$$

where $T_{SW}$ is a line selection duration of the row scan line; and Ix is the time point at which the duty cycle reference point is located;

a rising edge time point position $T_{rise}$ of a conduction duration of the LED string channel is expressed as:

$$T_{rise} = T_{SW} \cdot (1-P) \cdot X$$

a falling edge time point position $T_{fall}$ of the conduction duration of the LED string channel is expressed as:

$$T_{fall} = T_{SW} \cdot [P + (1-P) \cdot X]$$

where P is a duty cycle of the conduction of the channel; and different duty cycle reference point percentages X are set for the LED string channels.

In one embodiment, the number of the row scan lines is the same as the number of LED strings in the LED string channel.

The present invention also provides an LED backlight modulation method based on duty cycle reference point setting, the backlight modulation method being applied to an LED backlight control circuit with row and column scan lines, the LED backlight control circuit with row and column scan lines including a plurality of LED string channels, each consisting of a predetermined number of multiple LED strings, and for all the LED strings in each LED string channel, the LED strings each being connected at high potential terminals thereof to unique one of a plurality of row scan lines, each of the row scan lines being provided with a switching device; wherein
  a duty cycle reference is set for each LED string channel, the duty cycle reference point being located in a selected duration of the row scan line, and the duty cycle reference point percentage X of the duty cycle reference point being expressed as:

$$X = \frac{T_X}{T_{SW}}; \text{ and } 0 < X < 1;$$

where $T_{SW}$ is a line selection duration of the row scan line; and $T_X$ is the time point at which the duty cycle reference point is located;
  when a conduction duration of the LED string channel is $T_{CH}$ and a conduction duty cycle of the channel is P, $T_{CH} = T_{SW} \cdot P;$ if $T_{CH} \leq T_{SW} \cdot (1-X)$, then a rising edge time point position $T_{rise}$ of the conduction duration of the LED string channel is expressed as:

$T_{rise} = T_{SW} \cdot X$, and a falling edge time point position $T_{fall}$ of the conduction duration of the LED string channel is expressed as:

$T_{fall} = T_{SW} \cdot [P+X]$ otherwise, the rising edge time point position $T_{rise}$ of the conduction duration of the LED string channel is expressed as:

$T_{rise} = T_{SW} \cdot (1-P)$, and the falling edge time point position $T_{fall}$ of the conduction duration of the LED string channel is expressed as:

$T_{fall} = T_{SW}$; and different duty cycle reference point percentages X are set for the LED string channels.

In one embodiment, the number of the row scan lines is the same as the number of LED strings in the LED string channel.

The present invention also provides an LED backlight modulation method based on duty cycle reference point setting, the LED backlight modulation method being applied to an LED backlight control circuit with row and column scan lines, the LED backlight control circuit with row and column scan lines including a plurality of LED string channels, each consisting of a predetermined number of multiple LED strings, and for all the LED strings in each LED string channel, the LED strings each being connected at high potential terminals thereof to unique one of a plurality of row scan lines, each of the row scan lines being provided with a switching device; wherein
  a duty cycle reference is set for each LED string channel, the duty cycle reference point being located in a selected duration of the row scan line, and the duty cycle reference point percentage X of the duty cycle reference point being expressed as:

$$X = \frac{T_X}{T_{SW}}; \text{ and } 0 < X < 1;$$

where $T_{SW}$ is a line selection duration of the row scan line; and $T_X$ is the time point at which the duty cycle reference point is located;
  when a conduction duration of the LED string channel is $T_{CH}$ and a conduction duty cycle of the channel is P, $T_{CH} = T_{SW} \cdot P;$ if $T_{CH} \leq T_{SW} \cdot X$, then a rising edge time point position $T_{rise}$ of the conduction duration of the LED string channel is expressed as:

$T_{rise} = T_{SW} \cdot (X-P)$, and a falling edge time point position $T_{fall}$ of the conduction duration of the LED string channel is expressed as:

$T_{fall} = T_{SW} \cdot X$ otherwise, the rising edge time point position $T_{rise}$ of the conduction duration of the LED string channel is expressed as:

$T_{rise} = 0$, and the falling edge time point position $T_{fall}$ of the conduction duration of the LED string channel is expressed as:

$T_{fall} = T_{SW} \cdot P$; and different duty cycle reference point percentages X are set for the LED string channels.

In one embodiment, the number of the row scan lines is the same as the number of LED strings in the LED string channel.

Compared with the prior art, one or more embodiments of the present invention may have the following advantages:
  1. In the present invention, different duty cycle reference points are set for the LED string channels in the LED backlight control circuit in row-column mode, whereby the LED string channels can be turned on or off at different time points during a turn-on duration of the row scan line to achieve lighting in the duty cycle, so as to realize the staggered setting of the turn-on time point and turn-off time point of each channel and avoid the need for large current jump at a power drive terminal.
  Additional features and advantages of the present invention will be set forth in the description which follows, and will in part be apparent from the description, or appreciated by implementation of the present invention. The objects and other advantages of the present invention may be realized and attained by the configuration particularly illustrated in the description, claims, and accompanying drawings.

BRIEF DESCRIPTION OF THE DRAWINGS

The accompanying drawings are used to provide further understanding of the present invention, and constitute a part of the description, and are used along with the examples of the present invention to explain the present invention, but is not a limitation to the present invention. In the accompanying drawings.

DETAILED DESCRIPTION OF THE EMBODIMENTS

In order to clarify the object, technical solution, and advantages of the present invention, the present invention will be further described in detail below in conjunction with the accompanying drawings.

Figure 1:
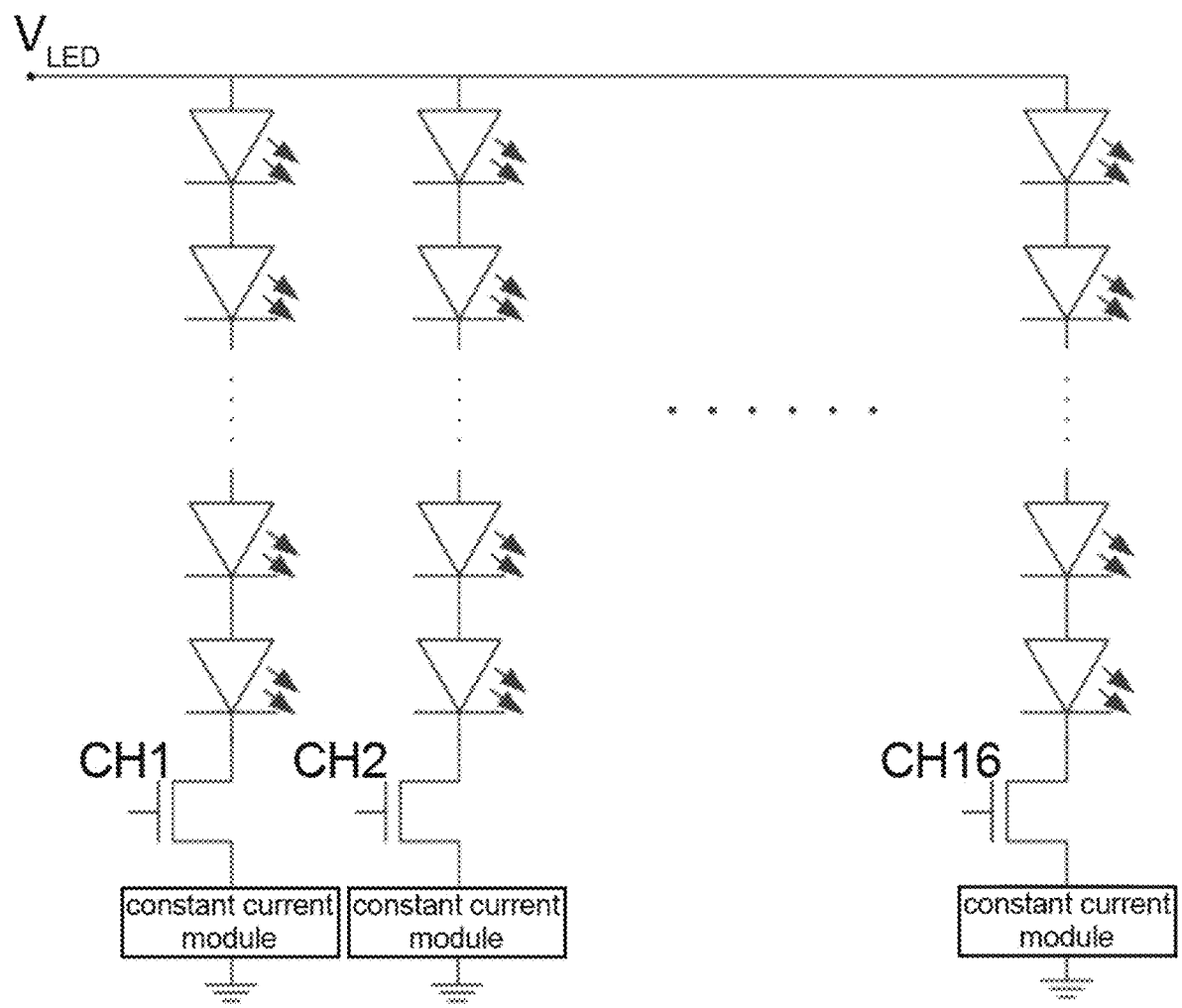
FIG. 1 is a schematic diagram of an LED backlight drive control circuit using a direct drive mode in the prior art.
Figure 2:
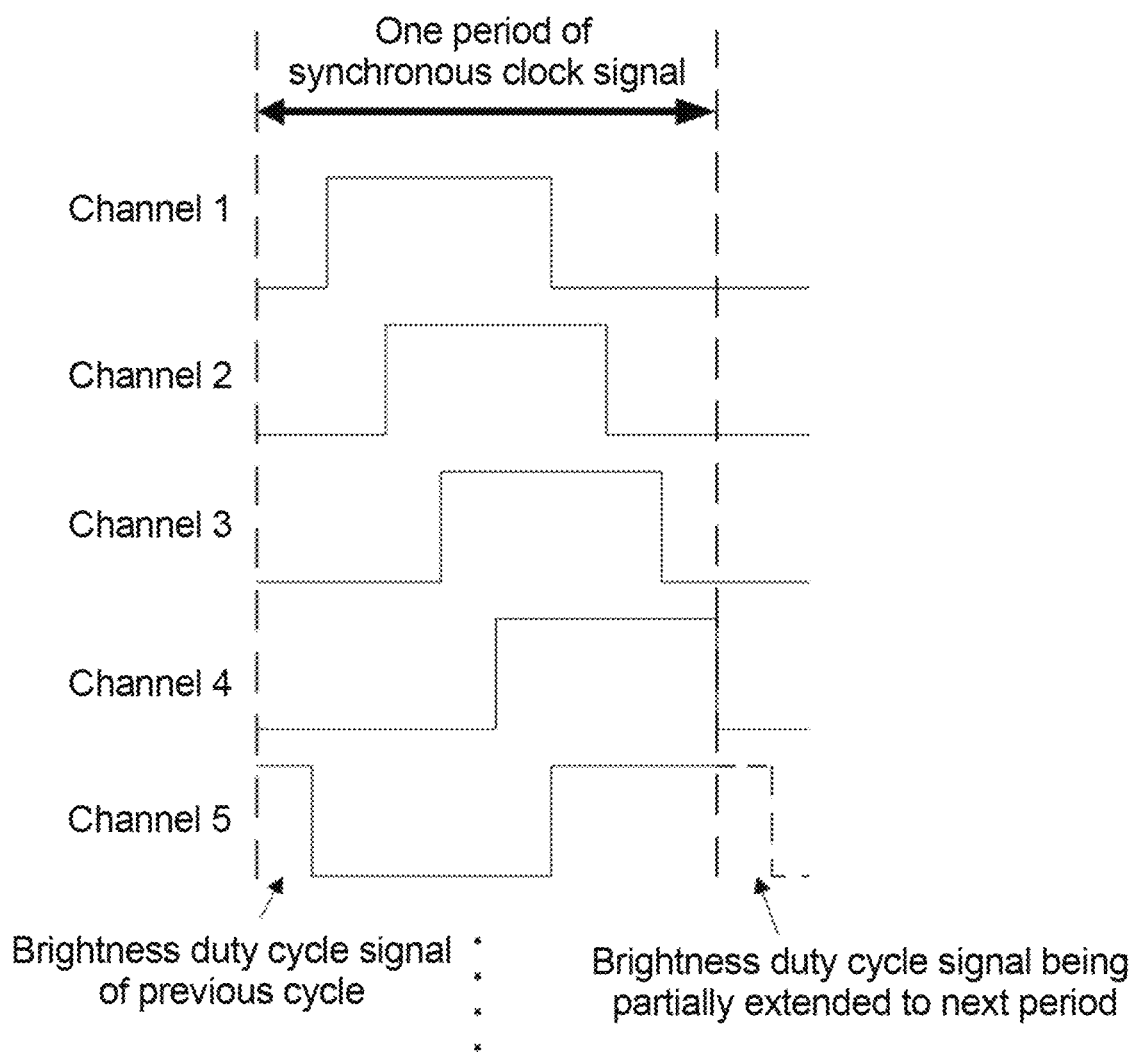
FIG. 2 is a schematic diagram of the time sequence of the staggered setting of the turn-on time points and turn-off time points of the LED string channels in the LED backlight drive control circuit using a direct drive mode in the prior art.
Figure 3:
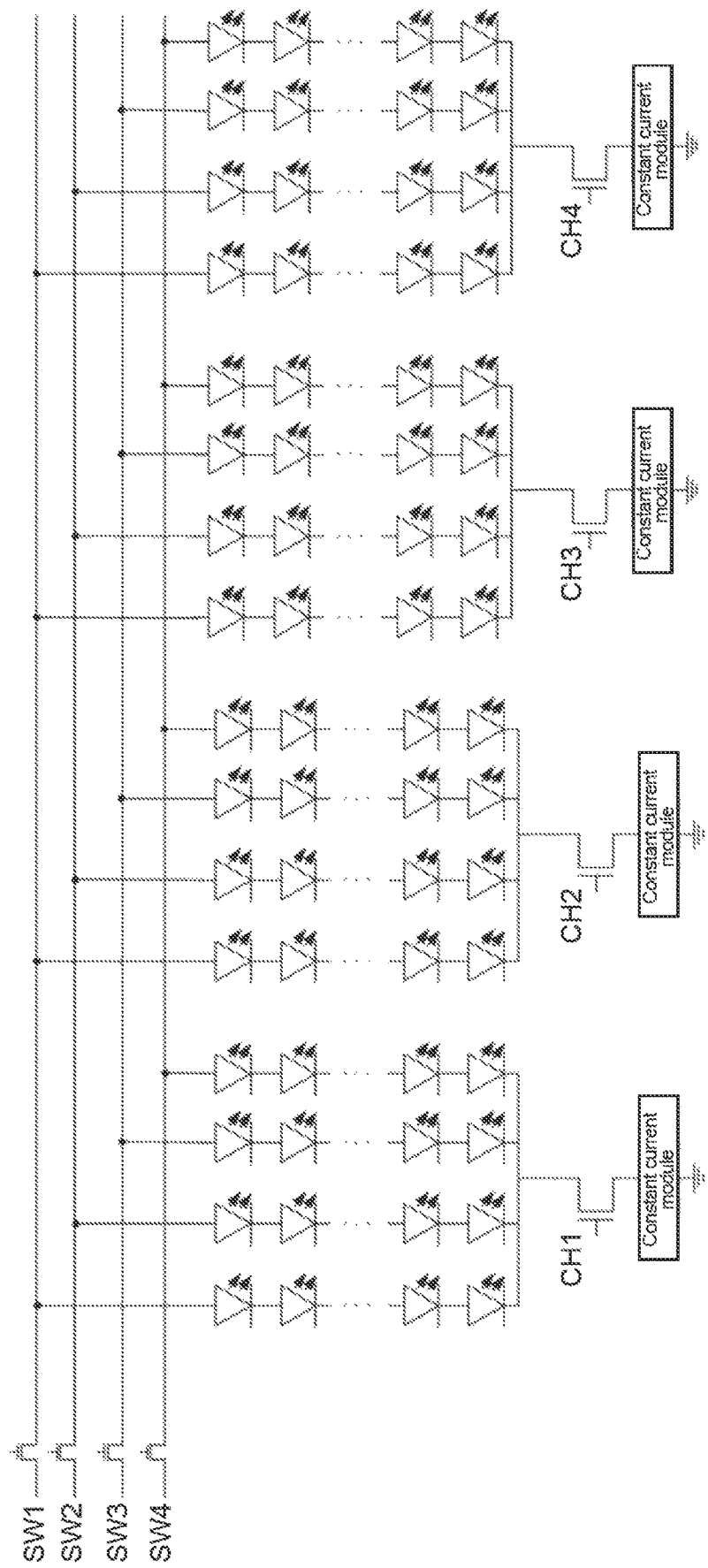
FIG. 3 is a schematic diagram of an LED backlight control circuit with row and column scan lines corresponding to the LED backlight modulation method of the present invention.

FIG. 3 shows an LED backlight control circuit with row and column scan lines corresponding to the LED backlight modulation method of the present invention. The LED backlight control circuit with row and column scan lines includes four row scan lines, each of which is provided with a switching device for achieving selection of the row scan line. In addition, every four LED strings constitute an LED string channel. The four LED strings in each LED string channel, each LED string is connected to unique one of the four row scan lines. Namely, the four LED strings in each LED string channel are all connected to one row scan line.

Example 1

Figure 4:
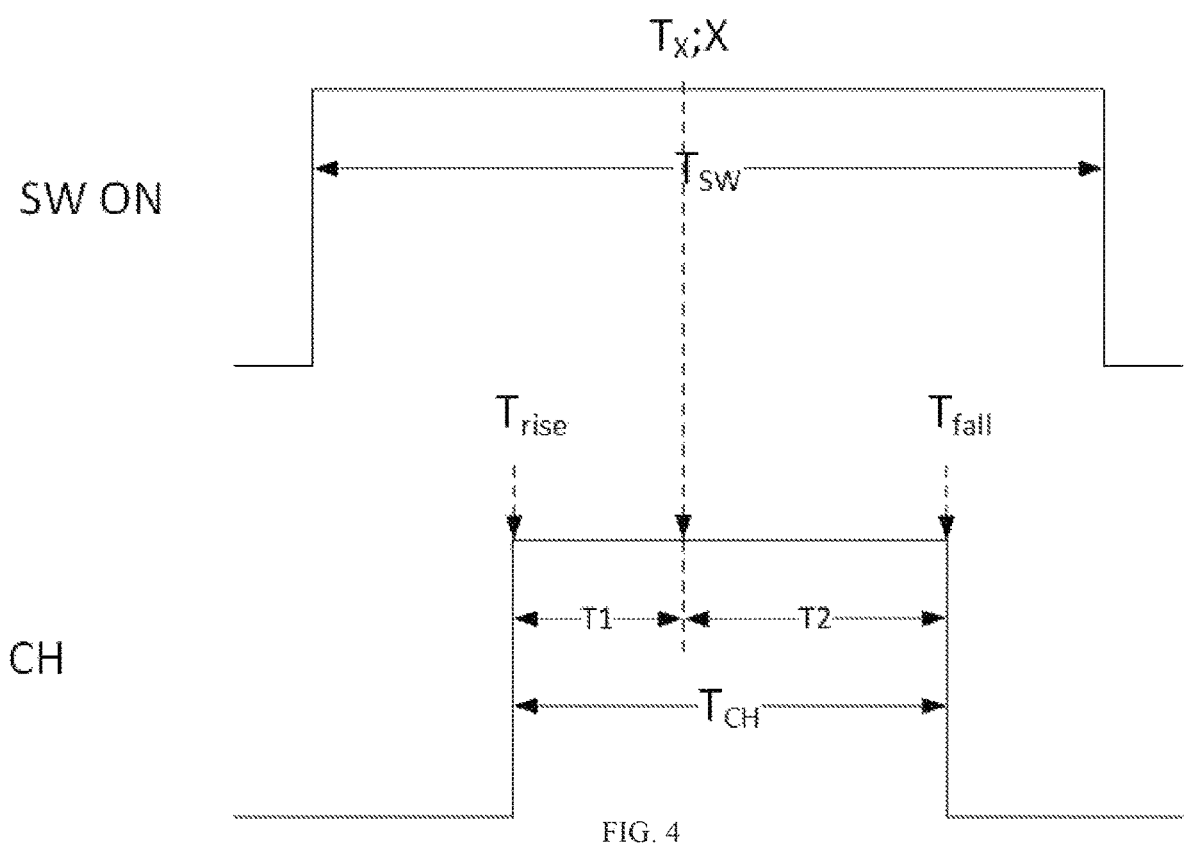
FIG. 4 is a schematic diagram of the time sequence of duty cycle reference point setting in an example of the present invention.

As shown in FIG. 4, in this example, different duty cycle reference points are set for the channels, and the duty cycle reference point is located in a selected duration of the row scan line. When a line selection duration of the row scan line is $T_{SW}$ and the time point at which the duty cycle reference point is located is expressed as $T_X$, the duty cycle reference point percentage X is expressed as:

$$X = \frac{T_X}{T_{SW}}; \text{ and } 0 < X < 1.$$

In addition, when a conduction duration of the LED string channel is $T_{CH}$ and a conduction duty cycle of the channel is P, $$T_{CH} = T_{SW} \cdot P.$$

In this example, taking the duty cycle reference point as a reference point, a duration T1 before the duty cycle reference point in the conduction duration $T_{CH}$ of the LED string channel is expressed as:

$T1 = T_{CH} \cdot X$, and a duration T2 after the duty cycle reference point is expressed as:

$T2 = T_{CH} \cdot (1-X)$.

Under this premise, a rising edge time point position $T_{rise}$ of the conduction duration of the LED string channel is expressed as:

$T_{rise} = T_X - T1$,

The above relationship is substituted thereinto, and $T_{rise} = T_{SW} \cdot (1-P) \cdot X$ is obtained.

In the same manner, a falling edge time point position $T_{fall}$ of the conduction duration of the LED string channel is expressed as:

$T_{fall} = T_{SW} \cdot [P + (1-P) \cdot X]$.

In this example, the duty cycle of the LED string channels is set to 50%, and settings for each channel are as follows:
the duty cycle reference point percentage of channel CH1 is set to 10%;
the duty cycle reference point percentage of channel CH2 is set to 25%;
the duty cycle reference point percentage of channel CH3 is set to 50%; and
the duty cycle reference point percentage of channel CH4 is set to 75%.

Figure 5:
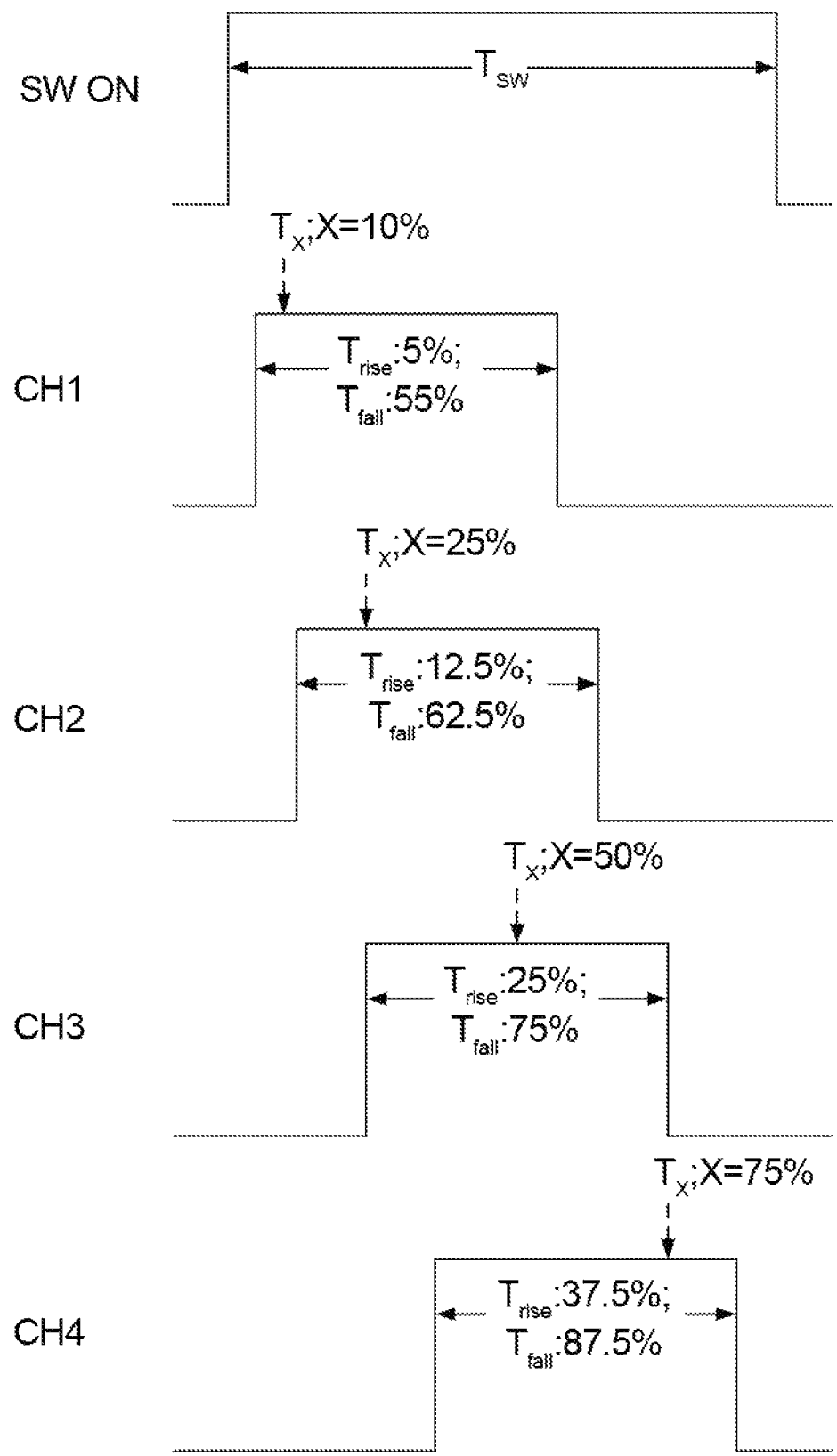
FIG. 5 is a time sequence diagram of an LED backlight modulation method based on duty cycle reference point setting in an example of the present invention.

According to the above formula, it can be found that:

For the conduction duration of the LED strings of channel CH1, the rising edge time point position $T_{rise}$ is 5%, and the falling edge time point position $T_{fall}$ is 55%;

For the conduction duration of the LED strings of channel CH2; the rising edge time point position $T_{rise}$ is 12.5%, and the falling edge time point position $T_{fall}$ is 62.5%;

For the conduction duration of the LED strings of channel CH3, the rising edge time point position $T_{rise}$ is 25%, and the falling edge time point position $T_{fall}$ is 75%; and For the conduction duration of the LED strings of channel CH4, the rising edge time point position $T_{rise}$ is 37.5%, and the falling edge time point position $T_{fall}$ is 87.5%;

The above duty cycle sequence is shown in FIG. 5. It can be seen that through setting different duty cycle reference point percentages X for CH1 to CH4, the rising edges of CH1 to CH4 conduction can be staggered and set at different times, and the falling edges are also staggered and set at different times, thereby avoiding the need to drive a power supply terminal to provide a large sudden change in current at the same time.

In this example, the duty cycle reference point percentage X value can be changed according to actual needs. When the number of channels changes, for each channel, a duty cycle reference point percentage X value different from those of other channels can be set, thereby realizing staggered setting of the turn-on time point and turn-off time point of the conduction of the channel.

Example 2

Similarly, in this example, different duty cycle reference points are set for the channels, and the duty cycle reference point is located in a selected duration of the row scan line. When a line selection duration of the row scan line is $T_{SW}$ and the time point at which the duty cycle reference point is located is expressed as $T_X$, the duty cycle reference point percentage X is expressed as:

$$X = \frac{T_X}{T_{SW}}.$$

In addition, when a conduction duration of the LED string channel is $T_{CH}$ and a conduction duty cycle of the channel is P, $T_{CH} = T_{SW} \cdot P.$ The difference of this example from Example 1 is that, taking the duty cycle reference point as a reference point, the conduction duration $T_{CH}$ of the LED string channel is obtained by extending afterward from the reference point. That is:

if, $T_{CH} \leq T_{SW} \cdot (1-X)$, $T_{rise} = T_{SW} \cdot X$ then, $T_{fall} = T_{SW} \cdot [P+X]$, $T_{rise} = T_{SW} \cdot (1-P)$ otherwise, $T_{fall} = T_{SW}$.

In this example, similarly, taking the duty cycle reference point as a reference point, the conduction duration $T_{CH}$ of the LED string channel is obtained by extending forward from the reference point. That is:

if, $T_{CH} \leq T_{SW} \cdot X$, $T_{rise} = T_{SW} \cdot (X-P)$ then, $T_{fall} = T_{SW} \cdot X$, $T_{rise} = 0$ otherwise, $T_{fall} = T_{SW} \cdot P$.

Through the above-mentioned method, it is also possible to set different duty cycle reference point percentages X for the channels, so that the rising edges and falling edges of the conduction of all the channels can be staggered and set at different times, thereby avoiding; the need to drive a power supply terminal to provide a large sudden change in current at the same time.

The above description is merely specific implementation examples of the present invention, and the protective scope of the present invention is not limited thereto. The modification and substitution of the present invention made by any skilled person in the art within the technical specifications described in the present invention should fall within the protective scope of the present invention.

What is claimed is:

1. A light-emitting diode (LED) backlight modulation method based on duty cycle reference point setting, the LED backlight modulation method being applied to an LED backlight control circuit with row and column scan lines, the LED backlight control circuit with row and column scan lines comprising a plurality of LED string channels, each consisting of a predetermined number of multiple LED strings, and for all the LED strings in each LED string channel, the LED strings each being connected at high potential terminals thereof to unique one of a plurality of row scan lines, each of the row scan lines being provided with a switching device; wherein:
  a duty cycle reference point is set for each LED string channel, a duty cycle reference point being located in a selected duration of the row scan line, and a duty cycle reference point percentage X of the duty cycle reference point being expressed as:

$$X = \frac{T_X}{T_{SW}};$$

and 0<X<1;

wherein $T_{SW}$ is a line selection duration of the row scan line; and $T_X$ is a time point at which the duty cycle reference point is located;
  a rising edge time point position $T_{rise}$ of a conduction duration of the LED string channel is expressed as:

$T_{rise} = T_{SW} \cdot (1-P) \cdot X$;

a falling edge time point position $T_{fall}$ of the conduction duration of the LED string channel is expressed as:

$T_{fall} = T_{SW} \cdot [P+(1-P) \cdot X]$;

wherein P is a duty cycle of the conduction of the channel; and
  different duty cycle reference point percentages X are set for the LED string channels.

2. The LED backlight modulation method based on duty cycle reference point setting according to claim 1, wherein a number of the row scan lines is same as a number of LED strings in the LED string channel.

3. An LED backlight modulation method based on duty cycle reference point setting, the LED backlight modulation method being applied to an LED backlight control circuit with row and column scan lines, the LED backlight control circuit with row and column scan lines comprising a plurality of LED string channels, each consisting of a predetermined number of multiple LED strings, and for all the LED strings in each LED string channel, the LED strings each being connected at high potential terminals thereof to unique one of a plurality of row scan lines, each of the row scan lines being provided with a switching device; wherein:
  a duty cycle reference point is set for each LED string channel, a duty cycle reference point being located in a selected duration of the row scan line, and a duty cycle reference point percentage X of the duty cycle reference point being expressed as:

$$X = \frac{T_X}{T_{SW}};$$

wherein $T_{SW}$ is a line selection duration of the row scan line; and $T_X$ is a time point at which the duty cycle reference point is located;
  when a conduction duration of the LED string channel is $T_{CH}$ and a conduction duty cycle of the channel is P, $T_{CH} = T_{SW} \cdot P$;

if $T_{CH} \leq T_{SW} \cdot (1-X)$, then a rising edge time point position $T_{rise}$ of the conduction duration of the LED string channel is expressed as:

$T_{rise} = T_{SW} \cdot X$, and a falling edge time point position $T_{fall}$ of the conduction duration of the LED string channel is expressed as:

$T_{fall} = T_{SW} \cdot [P+X]$, otherwise, the rising edge time point position $T_{rise}$ of the conduction duration of the LED string channel is expressed as:

$T_{rise} = T_{SW} \cdot (1-P)$, and the falling edge time point position $T_{fall}$ of the conduction duration of the LED string channel is expressed as:

$T_{fall} = T_{SW}$; and different duty cycle reference point percentages X are set for the LED string channels.

4. The LED backlight modulation method based on duty cycle reference point setting according to claim 3, wherein a number of the row scan lines is same as a number of LED strings in the LED string channel.

5. An LED backlight modulation method based on duty cycle reference point setting, the LED backlight modulation method being applied to an LED backlight control circuit with row and column scan lines, the LED backlight control circuit with row and column scan lines comprising a plurality of LED string channels, each consisting of a predetermined number of multiple LED strings, and for all the LED strings in each LED string channel, the LED strings each being connected at high potential terminals thereof to unique one of a plurality of row scan lines, each of the row scan lines being provided with a switching device; wherein:

a duty cycle reference point is set for each LED string channel, a duty cycle reference point being located in a selected duration of the row scan line, and a duty cycle reference point percentage X of the duty cycle reference point being expressed as:

$$X = \frac{T_X}{T_{SW}};$$

wherein $T_{SW}$ is a line selection duration of the row scan line; and $T_X$ is a time point at which the duty cycle reference point is located;

when a conduction duration of the LED string channel is $T_{CH}$ and a conduction duty cycle of the channel is P, $T_{CH} = T_{SW} \cdot P;$ if $T_{CH} \leq T_{SW} \cdot X$, then a rising edge time point position $T_{rise}$ of the conduction duration of the LED string channel is expressed as:

$T_{rise} = T_{SW} \cdot (X-P)$, and a falling edge time point position $T_{fall}$ of the conduction duration of the LED string channel is expressed as:

$T_{fall} = T_{SW} \cdot X$ otherwise, the rising edge time point position $T_{rise}$ of the conduction duration of the LED string channel is expressed as:

$T_{rise} = 0$, and the falling edge time point position $T_{fall}$ of the conduction duration of the LED string channel is expressed as:

$T_{fall} = T_{SW} \cdot P$; and different duty cycle reference point percentages X are set for the LED string channels.

6. The LED backlight modulation method based on duty cycle reference point setting according to claim 5, wherein a number of the row scan lines is same as a number of LED strings in the LED string channel.

* * * * *